US012645212B2

(12) United States Patent
Yang et al.

(10) Patent No.: US 12,645,212 B2
(45) Date of Patent: Jun. 2, 2026

(54) METHOD AND APPARATUS FOR CLASSIFICATION AND PREDICTION OF HEALTH OF A PHYSICAL SYSTEM

(71) Applicant: Siemens Mobility Austria GmbH, Vienna (AT)

(72) Inventors: Tsung-Yen Yang, Weehawken, NJ (US); Justinian Rosca, Princeton, NJ (US); Bernhard Lukas Girstmair, Graz (AT)

(73) Assignee: Siemens Mobility Austria GmbH, Vienna (AT)

( * ) Notice: Subject to any disclaimer, the term of this patent is extended or adjusted under 35 U.S.C. 154(b) by 482 days.

(21) Appl. No.: 18/263,759

(22) PCT Filed: Feb. 25, 2021

(86) PCT No.: PCT/US2021/019555
§ 371 (c)(1),
(2) Date: Aug. 1, 2023

(87) PCT Pub. No.: WO2022/182345
PCT Pub. Date: Sep. 1, 2022

(65) Prior Publication Data
US 2024/0111279 A1 Apr. 4, 2024

(51) Int. Cl.
*G05B 23/02* (2006.01)

(52) U.S. Cl.
CPC ....... *G05B 23/0254* (2013.01); *G05B 23/024* (2013.01)

(58) Field of Classification Search
CPC .............. G05B 23/0254; G05B 23/024; G05B 23/0256; G06N 3/044; G06N 3/0442;
(Continued)

(56) References Cited

U.S. PATENT DOCUMENTS

2016/0350194 A1* 12/2016 Mohan .............. G05B 23/0254
2018/0345496 A1 12/2018 Li et al.
(Continued)

OTHER PUBLICATIONS

Ehya et al., "Application of Machine Learning in Fault Detection", Nov. 30, 2022, Abstract (Year: 2022).*
(Continued)

*Primary Examiner* — Mi'schita' Henson

(57) ABSTRACT

A computer-implemented method for building a diagnostic module for a physical system includes obtaining simulated healthy measurements by a physics-based simulation model of the physical system from measured input excitations to the physical system. The method includes training a generator model to generate realistic healthy measurements from the simulated healthy measurements and the measured input excitations, the training involving tuning the generator model based on an error between a generated realistic healthy measurement and a corresponding real measurement obtained from the physical system in response to each input excitation. The trained generator model is used to generate realistic faulty measurement data from simulated faulty measurements obtained by the physics-based simulation model. The method includes training a classification model using a training dataset augmented by the realistic faulty measurement data generated by the generator model, to be able to predict health of the physical system during operation from measured operational data.

15 Claims, 2 Drawing Sheets

Excitation $u_t$

Physical System — 202

Real Measurement $a_t$

Signal Processing — 208

Physics-Based Simulation Model — 204

Simulated Healthy Measurement $\hat{a}_t$

Generator Model — 206

Realistic Healthy Measurement $a'_t$ error $|a_t - a'_t|$

(58) Field of Classification Search
     CPC ...... G06N 3/045; G06N 3/047; G06N 3/0475;
     G06N 3/084; G06N 3/09
     See application file for complete search history.

(56)                    References Cited

U.S. PATENT DOCUMENTS

2020/0131003 A1 *   4/2020   Zhou ................... G06N 3/0464
2020/0202221 A1     6/2020   Wang et al.

OTHER PUBLICATIONS

Zhang, Wei et al: "Machinery fault diagnosis with imbalanced data
using deep generative adversarial networks"; Measurement, Insti-
tute of Measurement and Control; London; GB; vol. 152; Dec. 14,
2019; XP086004458; ISSN: 0263-2241; DOI: 10.1016/J.
MEASUREMENT.2019.107377.
Chao, Manuel Arias et al: "Hybrid deep fault detection and isola-
tion: Combining deep neural networks and system performance
models"; arxiv.org, Cornell University Library; 201 Olin Library
Cornell University Ithaca; NY 14853; Aug. 5, 2019; XP081567202;
pp. 1-25.

* cited by examiner

FIG. 1

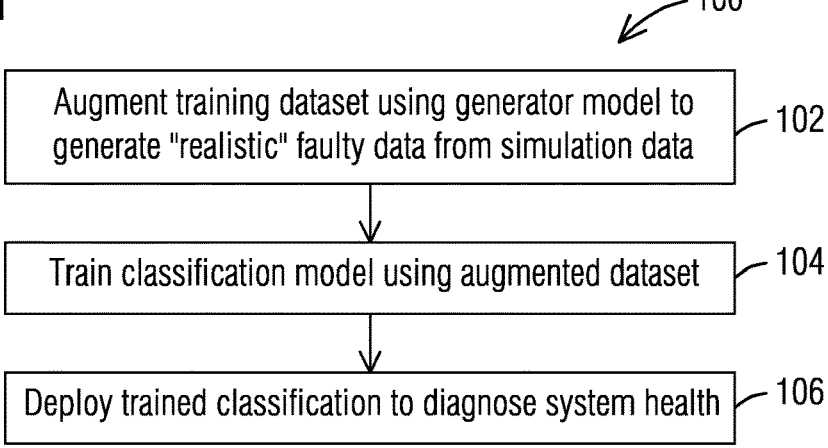

Augment training dataset using generator model to generate "realistic" faulty data from simulation data — 102

Train classification model using augmented dataset — 104

Deploy trained classification to diagnose system health — 106

FIG. 2

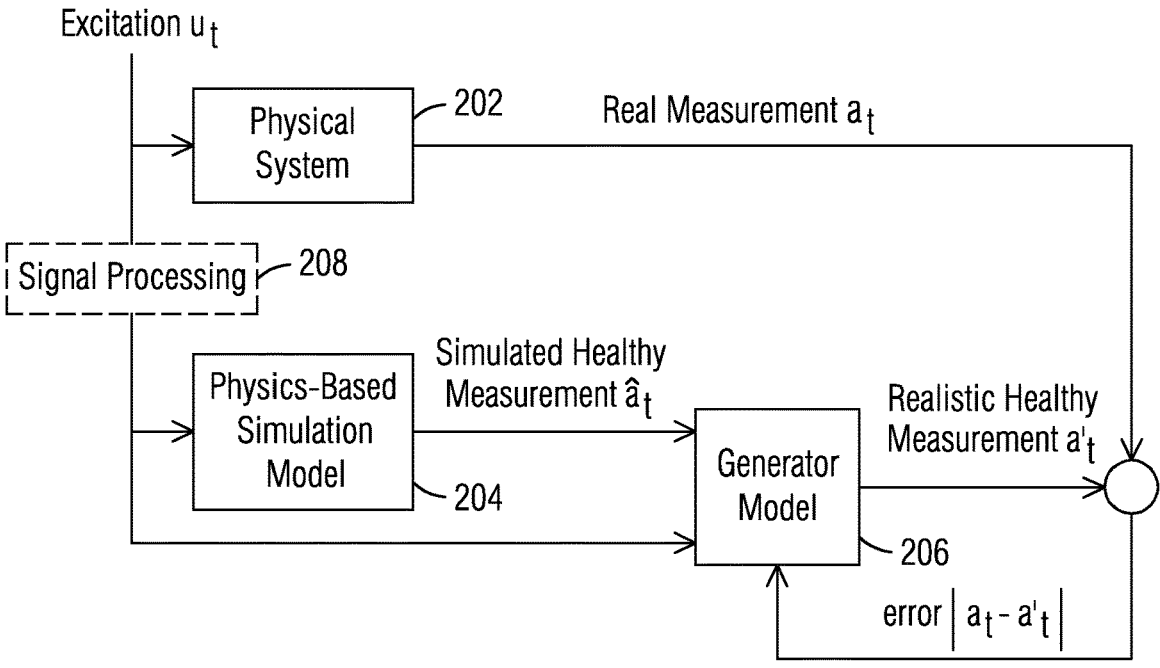

Excitation $u_t$

Physical System — 202

Real Measurement $a_t$

Signal Processing — 208

Physics-Based Simulation Model — 204

Simulated Healthy Measurement $\hat{a}_t$

Generator Model — 206

Realistic Healthy Measurement $a'_t$ error $|a_t - a'_t|$

FIG. 3

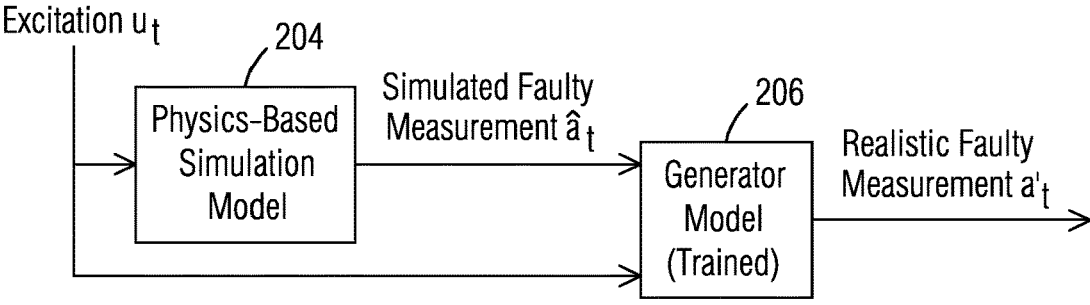

Excitation $u_t$

Physics-Based Simulation Model — 204

Simulated Faulty Measurement $\hat{a}_t$

Generator Model (Trained) — 206

Realistic Faulty Measurement $a'_t$

FIG. 4

Training Dataset

412 — Simulated Healthy ⟹ Realistic Healthy — 410   Real Healthy — 408

404 — Simulated Faulty ⟹ Realistic Faulty — 402   Real Faulty — 406

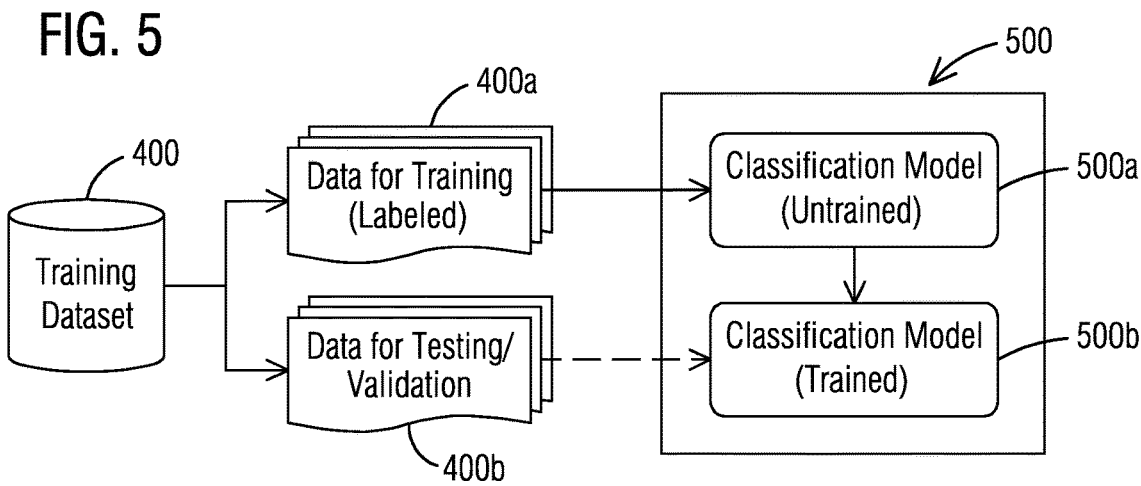

400

Training Dataset

Data for Training (Labeled) — 400a

Data for Testing/ Validation — 400b

Classification Model (Untrained) — 500a

Classification Model (Trained) — 500b

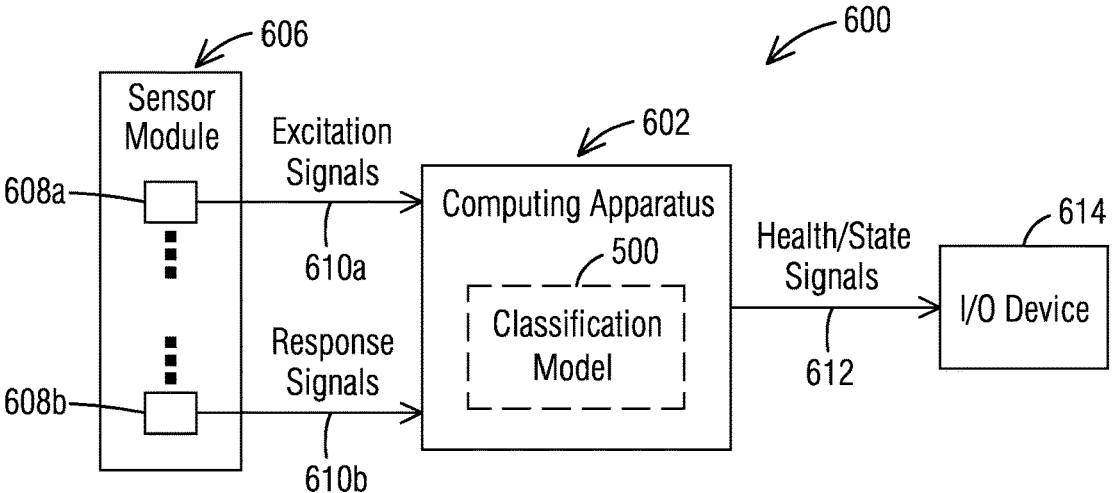

606 — Sensor Module

608a

608b

Excitation Signals — 610a

Response Signals — 610b

602 — Computing Apparatus

500 — Classification Model

Health/State Signals — 612

614 — I/O Device

600

METHOD AND APPARATUS FOR CLASSIFICATION AND PREDICTION OF HEALTH OF A PHYSICAL SYSTEM

TECHNICAL FIELD

The present disclosure relates to diagnostics and prognostics of physical systems. In particular, described embodiments relate to a technique for classification and prediction of health of a physical system integrating a physics-based simulation model with statistical and/or machine learning models.

BACKGROUND

Present statistical models for diagnosis and prediction (e.g. diagnosis of mechanical defects or abnormalities in a train bogie) rely on large amounts of historical data recorded in real operational conditions. Furthermore, they require data acquisition under abnormal conditions for a large variety of fault cases, which is not feasible to obtain. Faults are rare, and emulation of faults for large scale equipment (e.g. train bogies) is very expensive.

Detailed simulation models may be available, for example, as part of the digital twin of the mechanical ensembles (e.g. train bogies, etc.) manufactured. Unfortunately, very often, there exists a large gap between data obtained from simulation models and data obtained from real-world conditions. Data distributions and statistics in the two circumstances differ. Therefore, synthetic data from simulations is not practically very useful to build statistical models for classification of abnormalities.

SUMMARY

Aspects of the present disclosure address at least some of the above-mentioned technical challenges by providing a technique for classification and prediction of health of a physical system integrating a physics-based simulation model with statistical and/or machine learning models.

A first aspect of the disclosure provides a computer-implemented method for building a diagnostic module for a physical system. The method comprises obtaining simulated healthy measurements by a physics-based simulation model of the physical system from measured input excitations to the physical system. The method further comprises training a generator model to generate realistic healthy measurements from the simulated healthy measurements and the measured input excitations. The training of the generator model comprises tuning the generator model based on an error between a generated realistic healthy measurement and a corresponding real measurement obtained from the physical system in response to each input excitation. Next, the method comprises using the trained generator model to generate realistic faulty measurement data from simulated faulty measurements obtained by the physics-based simulation model. Subsequently, the method comprises training a classification model using a training dataset augmented by the realistic faulty measurement data generated by the generator model, the trained classification model configured to predict a health of the physical system during operation from measured operational data.

A further aspect of the disclosure provides a method for diagnosing health of an operating physical system. The method comprises obtaining measurement signals indicating an excitation of the operating physical system and obtaining measurement signals indicating a response of the operating physical system to the excitation. The method comprises predicting a health of the operating physical system from the measured excitation and the response of the operating physical system using a trained classification model obtained as described above.

Other aspects of the present disclosure implement features of the above-described method in computing systems and computer program products.

Yet another aspect of the disclosure provides a diagnostic system. The diagnostic system comprises a sensor module configured to measure an excitation of an operating physical system and measure a response of the operating physical system to the excitation. The diagnostic system further comprises a computing apparatus configured to process the above-described trained classification model that receives, as input, the measured excitation and response from the sensor module, and produces an output indicative of a predicted health of the operating physical system.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

FIG. 1 is a flowchart of an example method according to aspects of the present disclosure.

FIG. 2 is a schematic block diagram illustrating training of a generator model according to an example embodiment.

FIG. 3 is a schematic diagram illustrating generation of realistic faulty data by a trained generator model according to an example embodiment.

FIG. 4 is a schematic diagram illustrating structure of a training dataset for a classification model according to an example embodiment.

FIG. 5 is a schematic diagram illustrating training of a classification model according to an example embodiment.

FIG. 6 is a schematic block diagram illustrating a diagnostic system according to example embodiment.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Domain adaptation is a machine learning approach which addresses scenarios in which a model trained on a source dataset (e.g., simulation) is transferred and used on a different but related target dataset (e.g., real machine). However, in many large-scale industrial machines (e.g., trains, turbines, etc.), faulty data from real machines is often limited or even non-existent. This setting breaks the assumption that most of the domain adaptation frameworks assume, which is that faulty and healthy (nominal) data are similarly distributed. One of the challenges of domain adaptation is that it works when distributions of source and target data (in both nominal and fault regimes) are overlapping or very close. Known techniques of domain adaption fail when there exists no representative data e.g. representing fault in the real-world (or target) domain.

Embodiments of the present disclosure address the problem of unbalanced distribution of faulty and healthy data based on a technique of physics based domain adaptation that integrates a physics-based simulation model with a statistical or machine learning model (referred to as "generator" model) to reliably predict faulty data, which is used to augment a training dataset for a classification model. The generator model is trained using simulated healthy measurements and real (i.e., real-world) healthy measurements, which are readily available, to make a prediction of "realistic" healthy measurements. Once the generator model is trained to achieve accurate predictions, it is used to generate "realistic" faulty measurements based on simulated faulty measurements.

The term "realistic" measurement, in the context of this description, refers to a measurement predicted by the generator model, which is meant to closely approximate a real (i.e., real-world) measurement. The term "realistic" measurement may be used interchangeably with the term "predicted" measurement.

The disclosed technique is based on an inventive finding that the gap between the measurements predicted by the generator model and real-world measurements is independent of the state of the physical system (e.g., "healthy" or "faulty" state). As a result, the generator model disclosed herein can generalize beyond the data that has been used for training, to faulty data that can be totally absent in the training process. This is possible by enforcing the use of data that embeds physical constraints from a physics-based simulation model and transferring its capabilities to faulty conditions.

The disclosed technique obviates the need for large amounts of faulty data recorded in real-word conditions, which makes particularly suitable for diagnostics of large-scale physical systems where such faulty real-world data is often scarcely available. An example of a physical system, as illustrated in the disclosed embodiments, is a train bogie. It will be appreciated that aspects of the present disclosure may be suitably implemented for various other types of physical systems, such as wind turbines, gas turbines, and other large complex mechanical and electrical equipment.

Turning now to the drawings, FIG. 1 shows a flowchart of an example method 100 according to aspects of the present disclosure. FIG. 1 is not intended to indicate that all of the blocks of the method 100 are to be included in every case. For example, a first implementation may involve only activity blocks 102 and 104 for building an inventive diagnostic module, while a second implementation may involve only activity block 106 for deployment of the inventive diagnostic module. Additionally, the method 100 can include any suitable number of additional activities.

The method 100 is computer-implemented. This means that at least some of the steps (or substantially all the steps) of the method 100 are executed via one or more computer systems. For example, activity blocks 102 and 104 may be implemented offline and may involve hardware having high computational capability, such as a graphics processing unit (GPU), while activity block 106 may be implemented at run-time on a computing apparatus embedded in or located close to a physical system in operation.

Activity block 102 involves data augmentation using a physics-based simulation model of the physical system in combination with a generator model. Activity block 102 may be implemented in broadly two phases, namely a training-phase where the generator model is trained using simulated healthy measurements obtained by the physics-based simulation model (see example in FIG. 2), and a generation phase where the trained generator model is used to predict realistic faulty measurements from simulated faulty measurements obtained by the physics-based simulation model (see example in FIG. 3). The augmented dataset includes the predicted realistic faulty measurements as well as healthy measurements including that obtained from real-world measurements and/or predicted by the generator model (see FIG. 4).

Activity block 104 involves training a classification model using the augmented dataset produced by activity block 102 (see example in FIG. 5).

Activity block 106 involves deploying the trained classification model to diagnose health of a physical system under operation from measured operational data (see example in FIG. 6).

In one embodiment, as shown in FIG. 2, the training phase for the generator model 206 involves obtaining a real measurement at from a physical system 202 in response to an input excitation $u_r$. The excitation $u_r$ defines an input condition to the physical system 202 to produce a response. The excitation $u_r$ may be internal or external to the physical system 202. In this example, the physical system 202 is a train bogie. The excitation $u_r$ in this case typically includes the profile of the railway track being traversed by the train bogie. In various other examples, the physical system 202 may include a gas turbine, or a wind turbine or other machinery. The input excitation in such cases may include, for example, ambient temperature and fuel supply in case of a gas turbine, wind velocity in case of a wind turbine, and so on.

Continuing with the example of a train bogie, the profile of the track may be estimated, for example, from measurement signals from acceleration sensors coupled to one or more wheels of the train bogie, or by another device. The measurement $\alpha_r$ may be indicative, for example, of an oscillation of the train bogie or one or more sub-systems of the train bogie, induced by the track excitation. The measurement $\alpha_r$ may comprise measurement signals from sensors (e.g. velocity and/or acceleration sensors) mounted on one or more internal components of the train bogie. To improve sensitivity of the measurement signal $\alpha_r$, it may be desirable to limit the speed of the train bogie within a defined interval that provides a high signal-to-noise ratio (e.g., measurement noise is typically high at very low speeds).

In some implementations, the speed of the train bogie may be implicitly obtained from the track excitation signals, for example, by employing acceleration sensors coupled to multiple wheelsets of the train bogie. In other implementations, the speed of the train bogie may be explicitly specified in the input excitation $u_t$, for example, in case of an acceleration sensor being coupled to a single wheelset of the train bogie.

The physics-based simulation model 204 is a computerized model of the physical system 202. The physics-based simulation model 204 may be available, for example, as part of a digital twin of the physical system 202. In this example, the digital twin may comprise a high-fidelity digital model of the train bogie 202, which may utilize, for example, CAD models representing physical sub-systems or components of the train bogie 202. In other embodiments, instead of or in addition to employing CAD models, sensor data, such as imaging data, may be utilized to generate digital representations of the physical objects.

The physics-based simulation model 204 includes a physics engine configured to simulate a response of the physical system 202 to an input excitation. One of the challenges with a physics-based simulation is a discrepancy between an observed response in the real-world and a corresponding response for the same excitation carried out by simulation. Often, this discrepancy arises due to inaccuracies in the parameters used in the physics engine, among other inaccuracies in modeling. These parameters, referred to herein as physics parameters, include hidden state variables that may not be observed or measured directly. Examples of such physics parameters in the context of the illustrated embodiment include coefficient of friction between contacting components, damping constant and elastic constant of various components, among others.

Continuing with reference to FIG. 2, the physics-based simulation model 204 is excited precisely about the actual conditions measured from real-world operation. This is schematically depicted in FIG. 2 where the same excitation $u_t$ is input to the physics-based simulation model 204. It should be understood that the excitation provided to the physical system 202 is a physical excitation while the excitation provided as input to the physics-based simulation model 204 includes a measurement of the physical excitation that was provided to the physical system 202, typically obtained as measurement signals from one or more sensors. The measured excitation signal $u_t$ from the real-world may be preprocessed by a signal processing module 208 prior to being input to the physics-based simulation model 204. In the context of the present example, the pre-processing may involve integrating and double integrating the acceleration measurements to obtain speed and displacement of the train bogie. As noted above, in some embodiments, the speed of the train bogie may be explicitly specified as an input excitation.

During the training phase, the parameter values of the physics parameters used in the physics-based simulation model 204 lie in a nominal range, i.e., in a range validated and recommended in practice. That is, the parameter values correspond to a healthy state of the physical system 202. Thereby, the simulated response $\hat{\alpha}_t$ to each input excitation $u_t$ represents a simulated healthy measurement. The simulated healthy measurement $\hat{\alpha}_t$ is a good approximation but not necessarily an extremely precise prediction of the real measurement $\alpha_t$ obtained from the physical system 202.

The generator model 206 employs a statistical machine or a generative machine learning module, which is used to generate (or predict) realistic healthy measurements $\alpha'_t$ from the simulated healthy measurements $\hat{\alpha}_t$ and the corresponding measured input excitations $u_t$. The generator model 206 captures the underlying noise from the environment while using physics to constrain its prediction. In the disclosed embodiments, the generator model 206 comprises a neural network having a deep learning architecture. For example, based on the type of data collected, the generator model 206 can be either a multi-layer perceptron (MLP) (e.g. deep feed forward neural network) or a recurrent neural network (RNN) if memory of past observations or states is useful for the prediction step.

The training phase involves tuning of the generator model 206 (in this case, by repeated adjustment of parameters such as weights, biases, etc.) based on feedback of an error between a generated realistic healthy measurement $\alpha'_t$ and a corresponding real healthy measurement $\alpha_t$ obtained from the physical system 202 in response to each input excitation $u_t$. Tuning of the generator model 206 may be implemented, for example, based on a gradient descent algorithm to minimize an error function. The objective during the training phase is thus to generate predictions whose quality can be measured on real operational data. Since only healthy simulation data is used in this phase, the training of the generator model 206 does not require labeling of the training data.

Once the generator model 206 has been trained, in the generation phase, its operation may be transferred for abnormal conditions that are created purely in simulation, to generate realistic faulty measurements. Integrating the generator model 206 with the physics-based simulation model 204 leads to better generalizations based on the finding that the measurement noise is independent of the operational health of the physical system.

As shown in FIG. 3, in the generation phase, the physics-based simulation model 204 is configured to produce simulated faulty measurements $\hat{\alpha}_t$ in response to input excitations $u_t$ (which are not necessarily based on real measurements in this case). This may be achieved by using parameter values for one or more physics parameters that are outside of the nominal range. That is, the parameter values in this case correspond to a faulty state of the physical system 202. A faulty state is one defined by imminent failure or unsafe operation. The trained generator model 206, at each instance, uses a simulated faulty measurement $\hat{\alpha}_t$ and the corresponding input excitation $u_t$ to generate a realistic faulty measurement $\alpha'_t$. Simulated faulty data is plentifully available, as simulations including "faulty" or out-of-nominal-range parameters can be performed as desired. Thereby, an adequate amount of realistic faulty measurements $\alpha'_t$ may be generated to produce a balanced dataset for training a classification model, where faulty and healthy (nominal) data are similarly distributed. In some embodiments, as part of the generation phase, the trained generator model 206 may be operated to additionally generate realistic healthy measurements from simulated healthy measurements, to augment the dataset.

FIG. 4 schematically illustrates the structure of a training dataset 400. The dataset 400 may comprise a balanced distribution of healthy and faulty data. The faulty data comprises realistic (predicted) faulty data 402 obtained from simulated faulty data 404. Where available, real-world faulty data 406 may also be used. The healthy data may comprise real-world heathy data 408 and/or realistic (predicted) healthy data 410 obtained from simulated healthy data 412. Each data sample in the dataset 400 includes one or more measurements (indicative of system response) and a corresponding excitation. Furthermore, data samples in the dataset 400 may be provided with classification labels.

The classification model may include, for example, a statistical or a machine learning model. In the disclosed embodiments, the classification model comprises a neural network having a deep learning architecture. For example, based on the type of data collected, the classification model can be either a multi-layer perceptron (MLP) or a recurrent neural network (RNN). An RNN may be implemented, for example, through both feed forward and long short-term memory (LSTM).

FIG. 5 illustrates training of a classification model 500 according to an example embodiment. In this example, the dataset 400 shown in FIG. 4 is used to both train and test the classification model/neural network 500. As shown, a first portion 400a of the dataset 400 is used for training the untrained (skeleton) classification model 500a in a supervised learning regime and a second portion 400b of the dataset 400 is used for testing or validating the trained classification model 500b. To that end, each data sample in the dataset 400a is tagged with a classification label. Each classification label may include a binary variable (such as "healthy" and "faulty"). In some embodiments, a classification label may include a continuous variable (e.g., percentage health).

The supervised learning regime involves repeated adjustments of parameters (weights, biases) of the neural network via back propagation utilizing the training data 400a and the associated classification labels. After the completion of the supervised learning, the resultant trained classification model 500b may be tested or validated using unlabeled test data 400b. Testing the trained classification model 500b may be done, for example, to identify and correct overfitting of the neural network.

FIG. 6 is a schematic block diagram illustrating a diagnostic system 600 using a trained classification model for diagnosing health of a physical system under operation (referred to as "operating physical system"). The term "operating physical system" is used to distinguish the physical system for which the classification model is deployed from the physical system on which it was trained, as the two are not necessarily the same (although they might be so). For example, a classification model trained on a first train bogie may be deployed for diagnostics of a second train bogie with a similar architecture.

The diagnostic system 600 includes a computing apparatus 602 on which the classification model 500 is deployed. The computing apparatus 602 may be embedded in or located close to the operating physical system. In the present example, the computing apparatus 602 may be located in the train bogie or at another location onboard a locomotive vehicle. The computing apparatus 602 may, for example, be a programmable logic controller (PLC) or any other computing device having one or more processors capable of processing the classification model 500. In one embodiment, the computing apparatus 602 may be provided with one or more neural processing unit (NPU) modules. An NPU module comprises dedicated edge AI hardware which may be custom designed to run the classification model 500 in a computationally efficient fashion. In an alternate embodiment, the computing apparatus 602 may be remotely located from the operating physical system. For example, the computing apparatus 602 may include one or more computing devices in a cloud computing environment.

The diagnostic system 600 further comprises a sensor module 606 comprising a plurality of sensors. In particular, the sensor module 606 includes a first set of one or more sensors 608a producing measurement signals 610a indicative of excitation of the operating physical system, and a second set of one or more sensors 608b producing measurement signals 610b indicative of a response of the operating physical system to the excitation. In the present example, the sensors 608a may include acceleration sensors coupled to one or more locomotive wheels for estimating track excitation, while the sensors 608b may include acceleration/velocity sensors mounted on one or more components of the train bogie to measure an oscillation induced by the track excitation.

The sensors 608a, 608b communicate measurement signals 610a, 610b at discrete time steps during operation, which are processed and fed as input to the classification model 500. The classification model 500 classifies the measured operational data, i.e., the measured excitation and response of the operating physical system, to predict a health of the operating physical system at discrete time steps. In one embodiment, the health of the operating physical system is predicted as a binary state, for example, "healthy" or "faulty." A "faulty" state may be indicative of an imminent failure or unsafe operation and may be communicated by a warning notification. A warning notification may comprise, for example, an audible alarm, a visible indicator such as a flashing light, a display message, or combinations thereof. In other embodiments, the health of the operating physical system may be predicted as a continuous state, for example, as percentage health, to be displayed on a display screen. To this end, the computing apparatus 602 may be connected to any number of suitable I/O devices 614 to communicate health/state signals 612.

In one embodiment, the measurement data obtained from the operating physical system may be used to re-train the classification model 500, e.g., periodically. This allows the diagnostic system 600 to adapt to gradual changes in the operating physical system with time, for example, on account of aging/regular wear.

The disclosed diagnostic system enables technical personnel to replace components of machines that are predicted to be unsafe over time. This early fault detection prevents catastrophic events from happening and hence reduces the cost of the future maintenance. Further, the disclosed diagnostic system enables technical personnel to allocate resources effectively and plan ahead of time based on the predictions. This allows to dedicate resources to machines that need to be repaired as soon as possible.

The embodiments of the present disclosure may be implemented with any combination of hardware and software. In addition, the embodiments of the present disclosure may be included in an article of manufacture (e.g., one or more computer program products) having, for example, a non-transitory computer-readable storage medium. The computer readable storage medium has embodied therein, for instance, computer readable program instructions for providing and facilitating the mechanisms of the embodiments of the present disclosure. The article of manufacture can be included as part of a computer system or sold separately.

The computer readable storage medium can include a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. Computer readable program instructions described herein can be downloaded to respective computing/processing devices from a computer readable storage medium or to an external computer or external storage device via a network, for example, the Internet, a local area network, a wide area network and/or a wireless network.

The system and processes of the figures are not exclusive. Other systems, processes and menus may be derived in accordance with the principles of the disclosure to accomplish the same objectives. Although this disclosure has been described with reference to particular embodiments, it is to be understood that the embodiments and variations shown and described herein are for illustration purposes only. Modifications to the current design may be implemented by those skilled in the art, without departing from the scope of the disclosure.

The invention claimed is:

1. A computer-implemented method for building a diagnostic module for a physical system, comprising:

obtaining simulated healthy measurements by a physics-based simulation model of the physical system from measured input excitations to the physical system, training a generator model to generate realistic healthy measurements from the simulated healthy measurements and the measured input excitations, the training comprising tuning the generator model based on an error between a generated realistic healthy measurement and a corresponding real measurement obtained from the physical system in response to each input excitation, using the trained generator model to generate realistic faulty measurement data from simulated faulty measurements obtained by the physics-based simulation model, and training a classification model using a training dataset augmented by the realistic faulty measurement data generated by the generator model, the trained classification model configured to predict a health of the physical system during operation from measured operational data.

2. The method according to claim 1, wherein the training dataset for the classification model further comprises healthy measurement data including: real healthy measurements obtained from the physical system and/or realistic healthy measurements generated by the generator model.

3. The method according to claim 1, wherein the simulated faulty measurements are obtained by the physics-based simulated model using parameter values for one or more physics parameters that are outside of a nominal range.

4. The method according to claim 1, wherein the classification model is trained in a supervised learning regime based on a labeling of data samples in the training dataset.

5. The method according to claim 1, wherein the generator model and/or the classification model each comprises a neural network having a deep-learning architecture.

6. The method according to claim 1, wherein:

the physical system comprises a train bogie, and the input excitation is defined by a profile of a track traversed by the train bogie and the measurements in response to the input excitation are indicative of an oscillation induced by the track.

7. A method for diagnosing health of an operating physical system, comprising:

obtaining measurement signals indicating an excitation of the operating physical system, obtaining measurement signals indicating a response of the operating physical system to the excitation, and predicting a health of the operating physical system from the measured excitation and the response of the operating physical system using a trained classification model obtained by a method according to claim 1.

8. The method according to claim 7, further comprising retraining the classification model using measurement data obtained from the operating physical system.

9. The method according to claim 7, wherein the operating physical system for which the classification model is deployed is different from the physical system used to train the classification model.

10. A non-transitory computer-readable storage medium including instructions that, when processed by a computer, configure the computer to perform the method according to claim 7.

11. A computing apparatus comprising:

a processor; and a memory storing instructions that, when executed by the processor, configure the computing apparatus to execute a method according to claim 7.

12. A diagnostic system comprising:

a sensor module configured to measure an excitation of an operating physical system and measure a response of the operating physical system to the excitation, and a computing apparatus configured to process a trained classification model that receives, as input, the measured excitation and response from the sensor module, and produces an output indicative of a predicted health of the operating physical system, wherein the classification model is trained by:

obtaining simulated healthy measurements by a physics-based simulation model of a physical system from measured input excitations to the physical system, training a generator model to generate realistic healthy measurements from the simulated healthy measurements and the measured input excitations, the training comprising tuning the generator model based on an error between a generated realistic healthy measurement and a corresponding real measurement obtained from the physical system in response to each input excitation, using the trained generator model to generate realistic faulty measurement data from simulated faulty measurements obtained by the physics-based simulation model, and training the classification model using a training dataset augmented by the realistic faulty measurement data generated by the generator model.

13. The diagnostic system according to claim 12, wherein the training dataset for the classification model further comprises healthy measurement data including: real healthy measurements obtained from the physical system and/or realistic healthy measurements generated by the generator model.

14. The diagnostic system according to claim 12, wherein the simulated faulty measurements are obtained by the physics-based simulated model using parameter values for one or more physics parameters that are outside of a nominal range.

15. The diagnostic system according to claim 12, wherein the generator model and/or the classification model each comprises a neural network having a deep-learning architecture.

* * * * *